US011093750B2

(12) United States Patent
Hiramatsu

(10) Patent No.: US 11,093,750 B2
(45) Date of Patent: Aug. 17, 2021

(54) CONTROL SYSTEM

(71) Applicant: FANUC CORPORATION, Yamanashi (JP)

(72) Inventor: Akio Hiramatsu, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/793,735

(22) Filed: Feb. 18, 2020

(65) Prior Publication Data

US 2020/0272824 A1 Aug. 27, 2020

(30) Foreign Application Priority Data

Feb. 22, 2019 (JP) .............................. JP2019-030170

(51) Int. Cl.
*G06K 9/00* (2006.01)
*G05B 23/02* (2006.01)

(52) U.S. Cl.
CPC ......... *G06K 9/00718* (2013.01); *G05B 23/02* (2013.01); *G05B 23/0208* (2013.01); *G06K 9/0063* (2013.01); *G06K 9/00744* (2013.01)

(58) Field of Classification Search
CPC ............. G06K 9/00718; G06K 9/0063; G06K 9/00744; G06K 9/00771; G06K 9/00671; G05B 23/02; G05B 23/0208; G05B 23/027
See application file for complete search history.

(56) References Cited

U.S. PATENT DOCUMENTS

| 2008/0303643 | A1* | 12/2008 | Ishida | H04M 1/6058 |
| | | | | 340/332 |
| 2016/0203369 | A1* | 7/2016 | Inutsuka | G06K 9/00476 |
| | | | | 382/113 |
| 2016/0342839 | A1 | 11/2016 | Condel | |
| 2019/0005636 | A1 | 1/2019 | Dai et al. | |

FOREIGN PATENT DOCUMENTS

| JP | 2000-242327 | | 9/2000 | |
| JP | 2010153137 | A * | 7/2008 | ............. H05B 47/19 |
| JP | 2013-242648 | A | 12/2013 | |
| JP | 2017-224229 | A | 12/2017 | |
| JP | 2018-92499 | A | 6/2018 | |

OTHER PUBLICATIONS

Notification of Reasons for Refusal dated Apr. 27, 2021 in JP Patent Application No. 2019-030170.

* cited by examiner

*Primary Examiner* — Dhaval V Patel
(74) *Attorney, Agent, or Firm* — Wenderoth, Lind & Ponack, L.L.P.

(57) ABSTRACT

A control device in a control system has a lighting control section which requests so as to cause the lighting state of an indicator lamp of a specific control unit to change in a predetermined identification pattern, and the control device or a terminal has: an indicator lamp recognition section which recognizes the indicator lamp in an image; a change pattern recognition section which recognizes a change in the lighting state of the indicator lamp in the image; an indicator lamp specification section which specifies the indicator lamp having a change pattern in lighting state which matches the identification pattern, as the indicator lamp of the control unit which the lighting control section caused the lighting state to change in the identification pattern; and a display control section which causes information related to the control unit to be displayed on the monitor of the terminal.

5 Claims, 8 Drawing Sheets

CONTROL SYSTEM

This application is based on and claims the benefit of priority from Japanese Patent Application No. 2019-030170, filed on 22 Feb. 2019, the content of which is incorporated herein by reference.

BACKGROUND OF THE INVENTION

Field of the Invention

The present invention relates to a control system.

Related Art

In a factory or the like, a system has been used which centrally manages a plurality of control units by one control device which communicates with the plurality of control units. The individual control units are provided with display lights such as LEDs that display the operating state thereof. In a factory or the like using a plurality of control units, the plurality of control units are generally arranged collectively at one location inside of one control panel or the like.

The specification of the display lights of the control unit differ from each other, and it is not possible to easily distinguish whether or not operating normally simply at first glance. In addition, the arrangement of the plurality of control units is not decided, and it is not easy to confirm where a certain control unit thereamong is installed. For this reason, the system including a plurality of control units cannot easily specify a control unit in which a communication abnormality or the like occurred.

Patent Document 1 has a disclosure of "if aligning several LEDs on the I/O unit side of the control means, then capturing these by a photographing means, and detecting luminance data of turning ON and shutting OFF and the display position thereof, it is possible to handle optically as a display signal, and for this reason, possible to seize the execution state of control data at high speed.".

Patent Document 1: Japanese Unexamined Patent Application, Publication No. 2000-242327

SUMMARY OF THE INVENTION

With the system disclosed in Patent Document 1, it is necessary to clarify in advance of which control unit each LED is an LED. However, since inputting data associating an LED in a captured image and a control unit is complicated, it is not easy to handle a layout change such as replacement of a control unit. For this reason, a control system is desired which can easily specify a control unit.

A control system according to an aspect of the present disclosure is a control system which communicates with a plurality of control units having an indicator lamp capable of changing a lighting state as needed, and controls the plurality of control units, the control system including: a control device which communicates with the plurality of control units; and a terminal which has a camera and a monitor, and communicates with the control device; in which the control device has a lighting control section which requests so as to cause the lighting state of the indicator lamp of a specific one of the control units to change in a predetermined identification pattern; and in which the control device or the terminal has: an indicator lamp recognition section which recognizes the indicator lamp in an image captured by the camera of the terminal; a change pattern recognition section which recognizes a change in the lighting state of the indicator lamp in the image captured by the camera; an indicator lamp specification section which specifies the indicator lamp having a change pattern in lighting state recognized by the change pattern recognition section which matches the identification pattern, as the indicator lamp of the control unit which the lighting control section caused the lighting state to change in the identification pattern; and a display control section which causes information related to the control unit having the indicator lamp specified by the indicator lamp specification section to be displayed on the monitor of the terminal overlapping the image captured by the camera.

According to an aspect of the present disclosure, it is possible to easily confirm states of a plurality of control units.

DETAILED DESCRIPTION OF THE INVENTION

Hereinafter, a control system according to the respective embodiments of the present disclosure will be explained while referencing each of the drawings.

Figure 1:
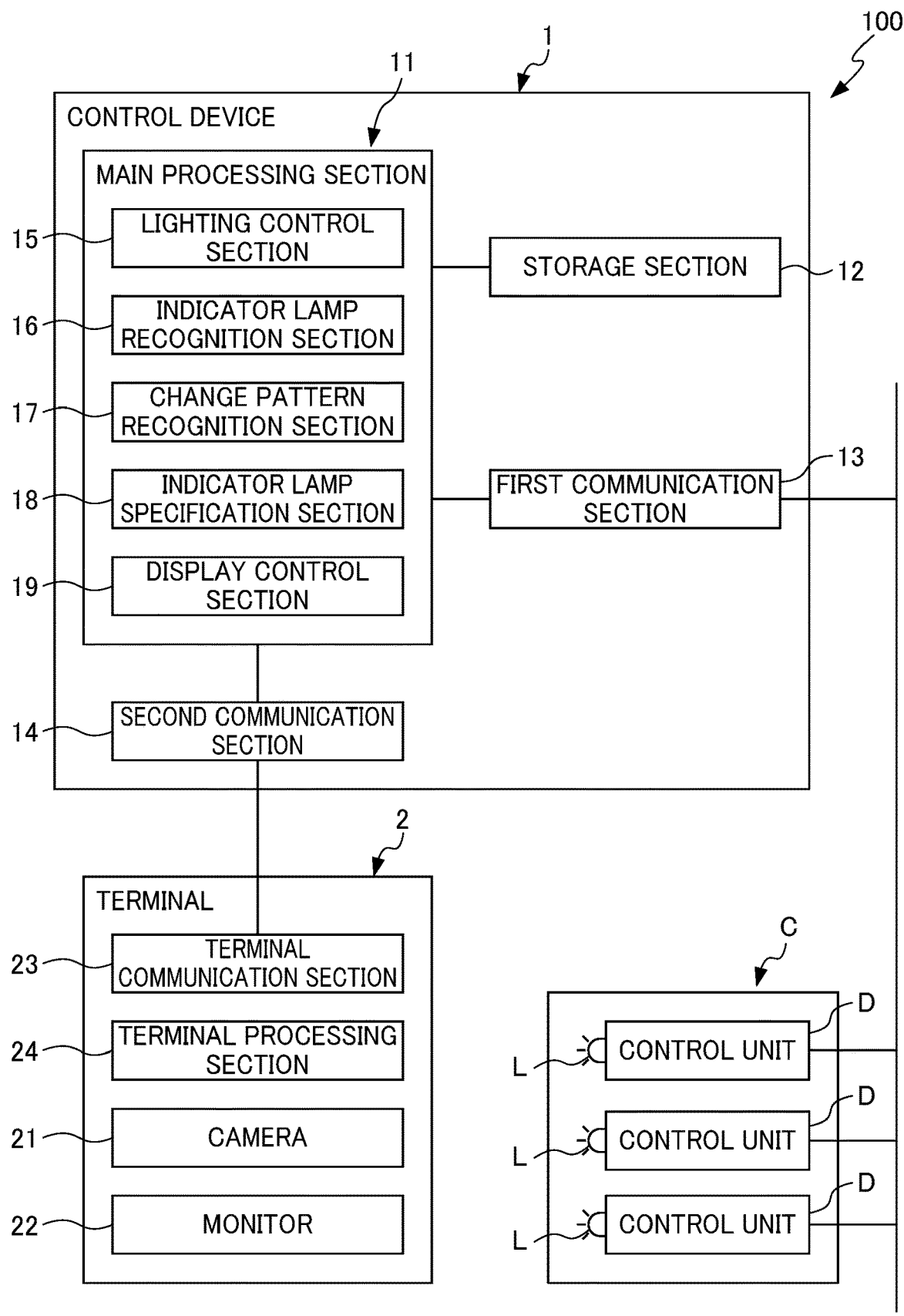
FIG. 1 is a block diagram showing the configuration of a control system according to a first embodiment of the present disclosure.
Figure 2:
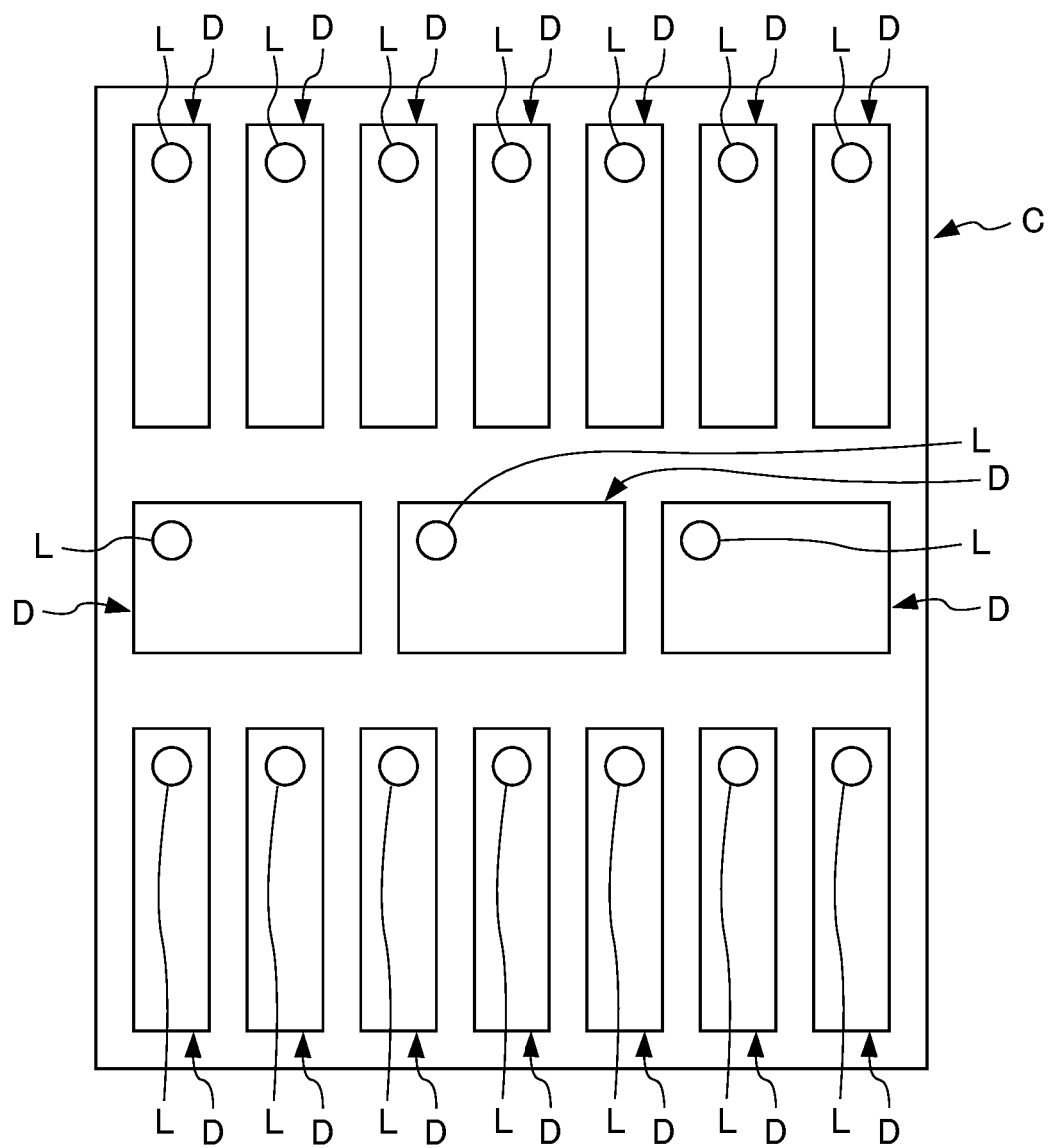
FIG. 2 is a schematic diagram showing a control panel accommodating a plurality of control units controlled by the control system in FIG. 1.
Figure 3:
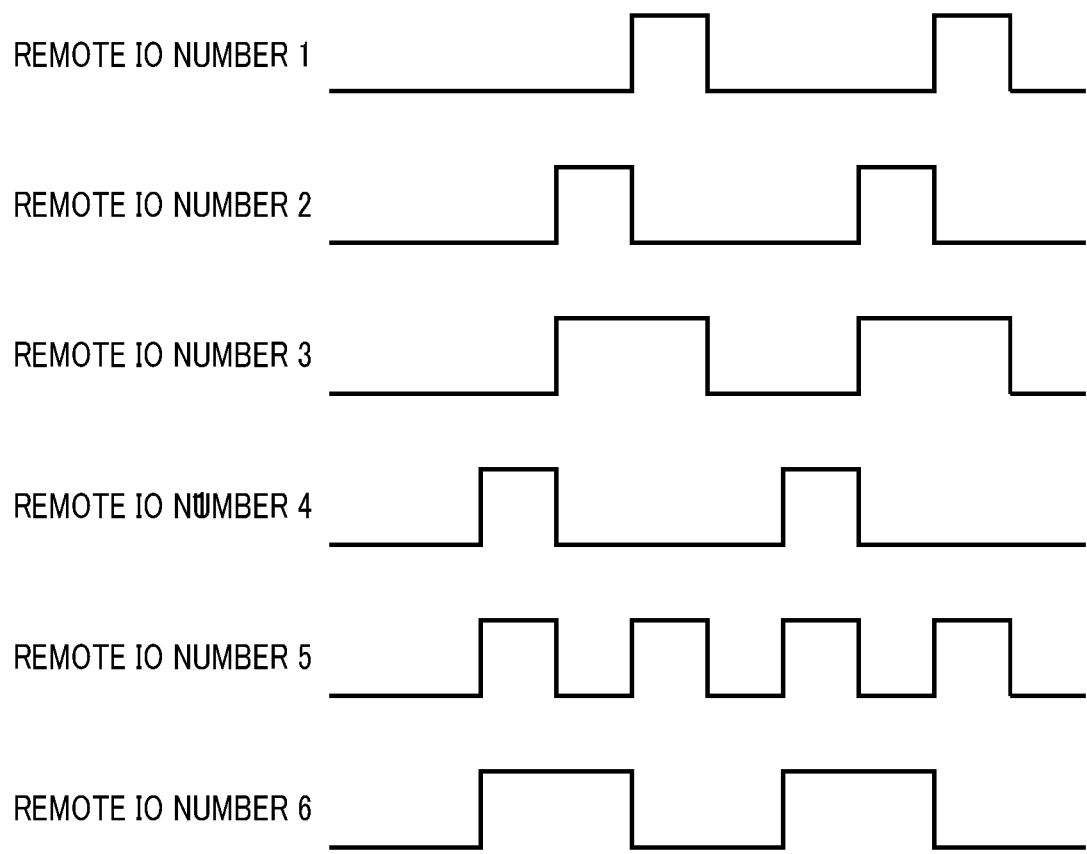
FIG. 3 is a flowchart illustrating identification patterns requested by a lighting control section of the control system in FIG. 1.

FIG. 1 is a block diagram showing the configuration of a control system 100 according to a first embodiment of the present disclosure. FIG. 2 is a schematic diagram showing a control panel C accommodating a plurality of control units D controlled by the control system 100 in FIG. 1.

The control system 100 communicates with the plurality of control units D having an indicator lamp L which can change the illumination state as needed, and controls the plurality of control units D.

The plurality of control units D controlled by the control system 100 each have the indicator lamp L, and can be arranged to accumulate at one location such as being arranged in line within the same control panel C. As a specific example, the control unit D can be established as equipment conforming to PROFINET (Ethernet communication standard for industry). The indicator lamp L, for example, may be able to emit light, such as a light bulb or light-emitting diode; however, it is preferable to configure by a relatively small, economical light-emitting diode, thereamong. In addition, the indicator lamp L may be an element that expresses a gradient; however, it is possible to establish as an element which transitions between the two values of a lighting state and shut-off state typically.

The control system 100 includes a control device 1 which communicates with the plurality of control units D, and a terminal 2 which communicates with the control device 1.

The control device 1 includes: a main processing section 11 which processes information; a storage section 12 which stores information; a first communication section 13 which communicates with the plurality of control units D; and a second communication section 14 which communicates with the terminal 2. In addition, the control device 1, although not shown, may further include an output device such as a monitor (display) and speaker, and an input device such as a keyboard, for example. The control device 1 can be configured by installing appropriate programs in a computer device having a CPU, memory, communication module, etc.

The main processing section 11 can be configured by the CPU of a computer device or the like, and realizes the functions described later by causing predetermined operations to be done according to programs. The storage section 12, for example, can be configured by a storage device such as memory or hard disk drive. The storage section 12 stores programs for realizing the main processing section 11, information generated by the main processing section 11 through operation, information related to the control units D, etc. As information related to the control unit D, for example, it is possible to establish as information compiling the number, specifications, etc. of each control unit for every number of remote IO of the control device 1. The first communication section 13 is configured by a well-known communication module capable of communicating with the control units D, and preferably is configured by a wired LAN module conforming to a standard such as Ethernet, for example. The second communication section 14 is configured by a well-known communication module capable of communication with the terminal 2, and preferably is configured by a wired LAN module conforming to a standard such as WiFi, for example. It should be noted that the first communication section 13 and second communication section 14 may be a single shared communication module.

The terminal 2 includes: a camera 21, monitor 22, terminal communication section 23 which communicates with the second communication section 14 of the control device 1, and a terminal processing section 24 which controls these constituent elements. The terminal 2 can be configured by installing the appropriate programs in a computer device having a communication function such as a smart phone, tablet or personal computer, for example. The terminal 2 preferably has portability in particular. In addition, the terminal 2 preferably has the camera 21 and monitor 22 laid out so that the monitor 22 can be easily confirmed (sighted), while photographing the control units D by the camera 21. More specifically, it is preferable for the camera 21 and monitor 22 to be arranged on opposite side surfaces of the terminal 2.

The main processing section 11 of the control device 1 is realized by causing predetermined operations to be done in the CPU according to programs. More specifically, the main processing section 11 has: a lighting control section 15 which requests so as to cause the lighting state of the indicator lamp L of a specific control unit D to change in a predetermined identification pattern; an indicator lamp recognition section 16 which recognizes the indicator lamp L in an image captured by the camera 21 of the terminal 2; a change pattern recognition section 17 which recognizes a change in the lighting state of the indicator lamp L in the image captured by the camera 21; an indicator lamp specifying section 18 which specifies an indicator lamp L having a change pattern of the lighting state recognized by the change pattern recognition section 17 that matches an identification pattern, as the indicator lamp L of the control unit D in which the lighting control section 15 caused the lighting state to change in the identification pattern; and a display control section 19 which causes information related to the control unit D having the indicator lamp L specified by the indicator lamp specification section 18 to be displayed on the monitor 22 of the terminal 2 to overlap the image captured by the camera 21. These constituent elements are functionally distinguished, and may not be clearly distinguishable in a program.

The lighting control section 15 causes the lighting state of the indicator lamp L of each control unit D to change in a different identification pattern for every control unit D. The identification pattern is sufficient so long as not overlapping between control units D; however, it is possible to use blinking patterns of the same time band started at the same timing. In the case of the request of the lighting control section 15 and the recognition by the change pattern recognition section 17 described later not being synchronized, for example, in the case of the delay from the request of the lighting control section 15 relative to unit time of the blinking of the identification pattern and the processing by the change pattern recognition section 17 being large, etc., the change pattern recognition section 17 cannot easily distinguish the starting point. In order to configure so that the change pattern recognition section 17 can easily distinguish the starting point of the identification pattern, each identification pattern may have a header part of a shared pattern showing the start of the identification pattern, and a unique part of a different pattern from each other continuing from the header part.

The lighting control section 15 identifies each control unit D, for example, by the number of the remote IO, network address, etc., and makes correspond one-to-one with the information of the control unit D stored in the storage section 12. The lighting control section 15 thereby manages in which identification pattern to cause each control unit D to blink.

The lighting control section 15 may cause the lighting state of the indicator lamp L of the plurality of control units D to change simultaneously in different identification patterns from each other. It is thereby possible to distinguish the indicator lamps L of the plurality of control units D. In addition, the lighting control section 15 may cause the lighting display of the indicator lamp L of the control unit D to change so as to repeat the identification pattern of fixed length. It is thereby possible to improve the distinction system of the control units D.

The indicator lamp recognition section 16 acquires an image captured by the camera 21 of the terminal 2 via the second communication section 14, and specifies the pixel range of the indicator lamp L from the brightness, etc. according to a well-known image processing technique. It should be noted that a plurality of indicator lights L may exist in the image.

The indicator lamp recognition section 16 preferably recognizes the pixel range of the indicator lamp L for every image, by acquiring the image captured by the camera 21 at fixed time intervals. In this case, the operation load may be reduced using a well-known method such that calculates the incremental difference from a previously captured image, and confirms the movement in the pixel range of the indicator lamp L.

Figure 4:
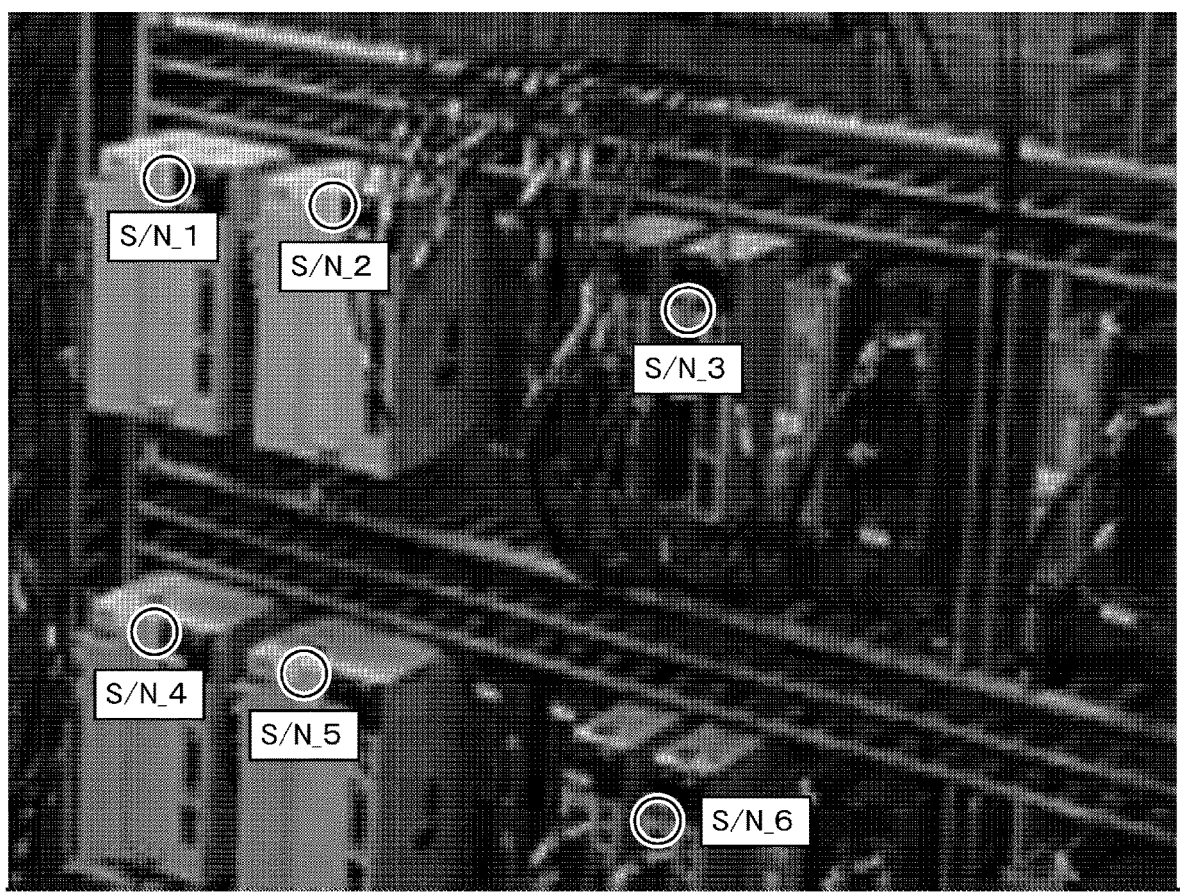
FIG. 4 is a view illustrating an image captured by a terminal of the control system in FIG. 1.

The indicator lamp recognition section 16 preferably assigns a number (serial number) distinguishing the plurality of indicator lights L recognized in the image. In a case of the range captured by the camera 21 moving, the indicator lamp recognition section 16 preferably is configured so that the number assigned to the same indicator lamp L does not change by a well-known means. FIG. 4 illustrates an image captured by the camera 21 of the terminal 2. This drawing is for explaining the following process, and is not necessarily displayed in the control system 100. In FIG. 4, a circular marker surrounding the pixel range of the indicator lamp L is added, and a serial number is shown adjacent to each one.

Figure 5:
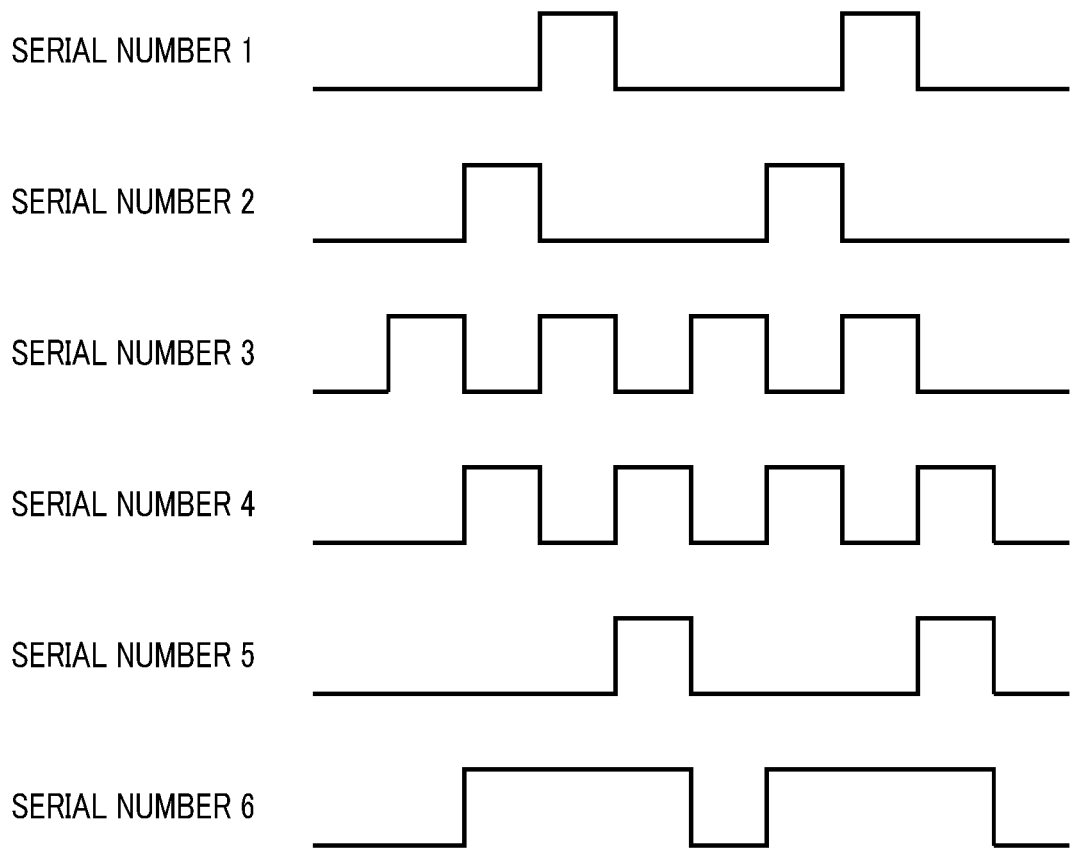
FIG. 5 is a time chart illustrating change patterns recognized by a change pattern recognition section of the control system in FIG. 1.

The change pattern recognition section 17 recognizes the lighting state of each indicator lamp L recognized by the display light recognition unit 16, i.e. confirms the brightness of each pixel range, and the change in time series of the lighting state of each indicator lamp L (referred to as change pattern). FIG. 5 shows an example of the change pattern recognized by the change pattern recognition section 17.

The indicator lamp specification section 18 extracts, among the change patterns recognized by the change pattern recognition section 17, a change pattern matching the identification pattern requested by the lighting control section 15 to the control unit D. Then, the indicator lamp specification section 18 specifies the indicator lamp L for which the lighting state changed in the change pattern matching this identification pattern, as the indicator lamp L of the control unit D having the lighting control section 15 causing the lighting state to change in the matching identification pattern. In other words, the indicator lamp specification section 18 links the serial number of the indicator lamp L having a change pattern matching the identification pattern with the information of the control unit D causing the lighting state to change in the matching identification pattern (associates as corresponding information).

Among the change patterns in FIG. 5, the change patterns of serial numbers 1, 2, 4 and 5 match the identification patterns requested in the control units D connected to the remote IO numbers 2, 4, 5 and 1 in FIG. 4, respectively. In this case, the indicator lamp specification section 18 links the information of the control unit D connected to the remote IO number 2 with the indicator lamp L of serial number 1; links the information of the control unit D connected to the remote IO number 4 with the indicator lamp L of serial number 2; links the information of the control unit D connected to the remote IO number 5 with the indicator lamp L of serial number 4; and links the information of the control unit D connected to the remote IO number 1 with the indicator lamp L of serial number 5.

The indicator lamp specification section 18, in the case of a plurality of indicator lights L being present having a change pattern of the lighting state recognized by the change pattern recognition section 17 matching the identification pattern, causes the lighting control section 15 to request to the plurality of control units D so as to cause the lighting state of the indicator lights L which are the same to change by substituting the identification pattern for which a plurality of matching change patterns exist with different identification patterns.

As a case in which a plurality of indicator lights L exists for which the change patterns of the lighting state recognized by the change pattern recognition section 17 match the identification pattern, although a very uncommon case, it is possible to exemplify a case of equipment which has an indicator lamp for which the lighting state changes irrespective of the request from the control device 1 existing within the range captured by the camera 21, and the change pattern of the lighting state of the indicator lamp of this unrelated equipment coincidentally matching any of the identification patterns requested by the control device 1. In such a case, by causing the lighting state of the indicator lamp L of this control unit D to change in a different identification pattern, it is possible to distinguish from the indicator lamps of unrelated equipment.

Figure 6:
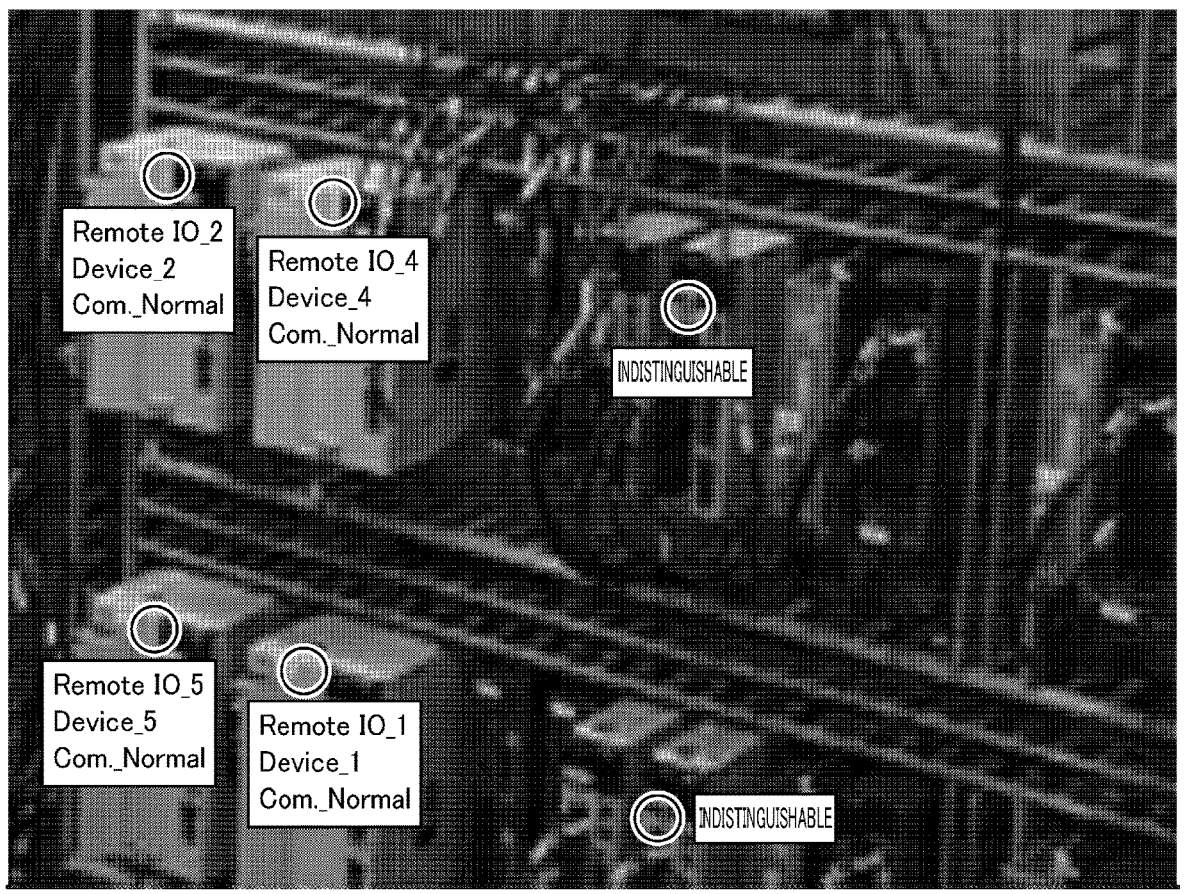
FIG. 6 is a view illustrating a display image on a monitor of the terminal of the control system in FIG. 1.

The display control section 19 causes an image overlapping the image currently being captured by the camera 21 to be displayed on the monitor 22 so that information of the control unit D linking the indicator lamp L is associated with the linked indicator lamp 1 by the indicator lamp specification section 18, as illustrated in FIG. 6.

The information of the control unit D displayed on the monitor 22 preferably includes the name of the control unit D. It is thereby possible for the operator to easily grasp which device is the control unit D having this indicator lamp L.

In addition, the information of the control unit D displayed on the monitor 22 is not limited to only information stored in the storage section 12, and may include information determined by the control device 1 such as of the communication state, information acquired from the control unit D by the control device 1 such as of the operating state of the control unit D, etc., for example. In particular, by displaying the communication state of the control device D having the indicator lamp L, it becomes possible for the operator to easily grasp whether the control system 100 can appropriately control the control unit D. In addition, the information of the control unit D displayed on the monitor 22 may be configured to be selectable on the terminal 2.

As the specific display method of information of the control unit D, for example, it is possible to exemplify a method of displaying information adjacent to the indicator lamp L; a method of displaying information to sprout (balloon) from the indicator lamp L; a method of displaying a drawn line linking the indicator lamp L with the information displayed at any location; a method of displaying information attached to an identification number at any location and displaying a corresponding identification number in the vicinity of the indicator lamp L; or the like.

In addition, the display control section 19 may display information indicating that this indicator lamp L could not be linked to a control unit D, to be associated with an indicator lamp L which the indicator lamp specification section 18 did not link to information of a control unit D.

Figure 7:
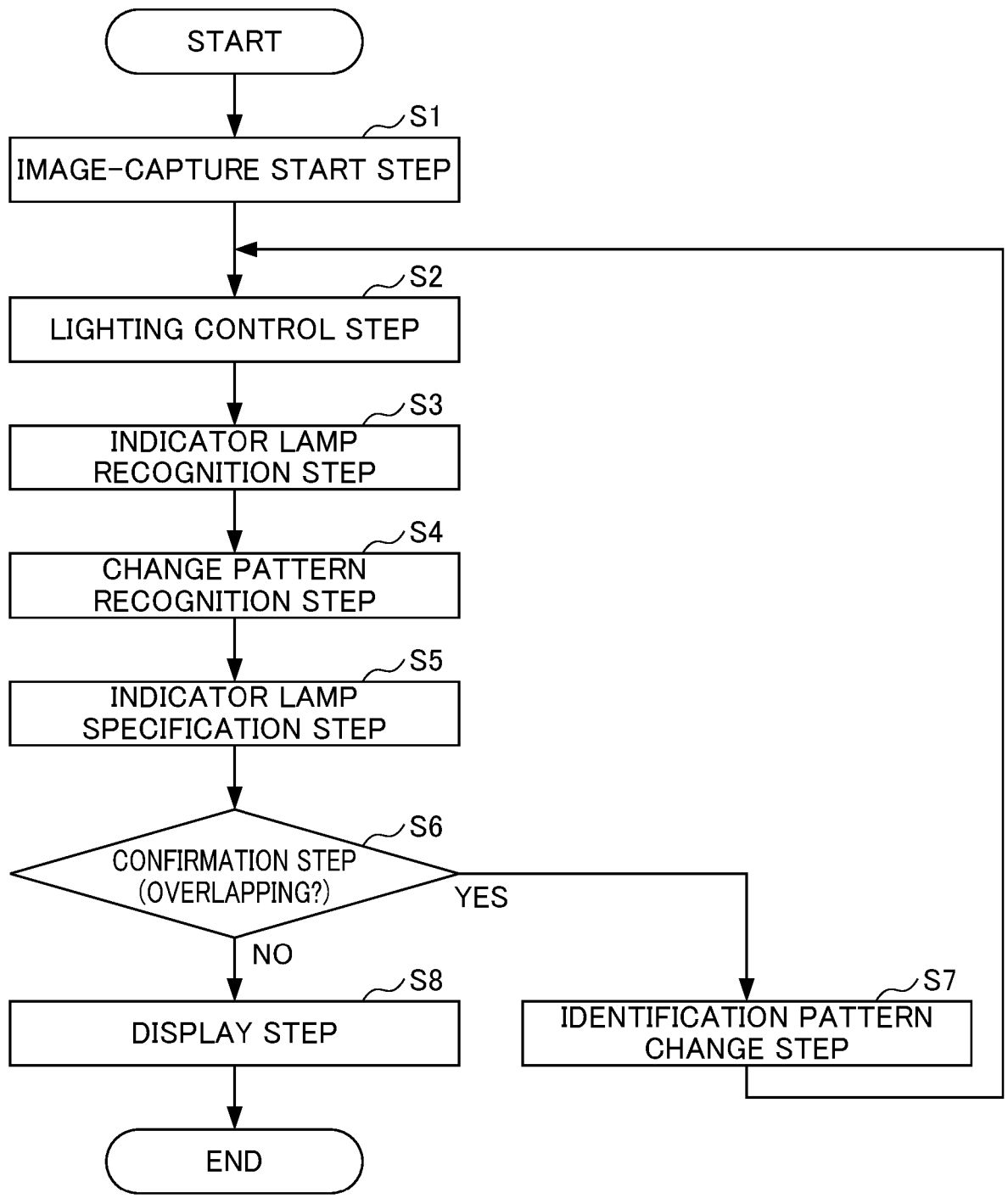
FIG. 7 is a flowchart showing a control unit confirmation sequence in the control of the control system in FIG. 1.

FIG. 7 shows a confirmation sequence of a control unit D in the control system 100. The confirmation process of the control unit D by the control system 100 includes: a step of an operator starting image capture of the indicator lamps L of a plurality of the control units D by the camera 21 of the terminal 2 (Step S1: image-capture start step); a step of causing the lighting state of the indicator lamp L to change in a different identification pattern for every control unit D by way of the lighting control section 15 (Step S2: lighting control step); step of recognizing the indicator lamp L in a captured image of the camera 21 by way of the indicator lamp recognition section 16 (Step S3: indicator lamp recognition step); step of recognizing a change pattern of the lighting state of each indicator lamp L by way of the change pattern recognition section 17 (Step S4: change pattern recognition step); step of specifying the indicator lamp L of the control unit D causing the lighting state to change in the recognition pattern by way of the indicator lamp specification section 18 (Step S5: indicator lamp specification step); step of confirming whether a plurality of indicator lamps L were specified as lamps of the same control unit D in the indicator lamp specification step (Step S6: confirmation step); step of changing the identification pattern for which a plurality of matching change patterns exist to different identification patterns (Step S7: identification pattern change step); and step of causing, by way of the display control section 19, information of the control unit D to which the indicator lamp L was linked to be displayed on the monitor 22 to overlap the image captured by the camera 21 (Step S8: display step).

In the image-capture start step of Step S1, the camera 21 and monitor 22 of the terminal 2 are activated, and the terminal 2 notifies the image-capture start of one or a plurality of control units D to the control device 1.

In the lighting control step of Step S2, the lighting control section 15 of the control device 1 requests so that the lighting state of the indicator lamp L changes in identification patterns which are not the same as each other in one or a plurality of control units D, as described above.

In the indicator lamp recognition step of Step S3, the indicator lamp recognition section 16 recognizes the pixel range of indicator lamp L in the image captured by the camera 21, as described above.

In the change pattern recognition step of Step S4, the change pattern recognition section 17 recognizes the change pattern of the lighting state of the indicator lamp L in the image captured by the camera 21, as described above.

In the indicator lamp specification step of Step S5, the indicator lamp specification section 18 specifies the indicator lamp L for which the lighting state changed in a change pattern matching the identification pattern, as described above.

In the confirmation step of Step S6, the indicator lamp specification section 18 confirms if the change pattern of a plurality of indicator lamps L match (overlap) the same identification pattern. In the case of the change patterns of a plurality of indicator lamps L matching (overlapping) the same identification pattern (YES), the processing advances to the identification pattern change step of Step S7. On the other hand, in the case of the change patterns of a plurality of indicator lamps L not matching (not overlapping) the same identification pattern (NO), the processing advances to the display step of Step S8.

In the identification pattern change step of Step S7, the indicator lamp specification section 18 changes the identification pattern matched by the change patterns of the plurality of indicator lamps L to another identification pattern. In the identification pattern change step, all of the identification patterns set in the lighting control section 15 may be changed. In the case of executing this identification pattern change step, the processing returns to the lighting control step of Step S2, and performs the steps of Step S2 and later again. In this case, for the other indicator lamp L, the corresponding relationship between the indicator lamp L specified in the previous indicator lamp specification step and the control unit D is stored, and in the confirmation step performed again, in the case of not conforming with the corresponding relationship specified in the indicator lamp specification step performed again, it may be configured so that the processing advances to the identification pattern change step of Step S7 again.

In the display step of Step S8, the display control section 19 displays information of the control unit D linked with the indicator lamp L on the monitor 22, as described above. This information may cause the changes in communication state determined by the control device 1, etc. to be successively reflected.

According to the control system 100 of the first embodiment of the present disclosure explained above, effects such as those explained below are exerted.

The control system 100 is a control system which communicates with a plurality of the control units D having the indicator lamp L capable of changing the lighting state as needed, and controls the plurality of control units D, and includes: the control device 1 which communicates with the plurality of control units D; the terminal 2 which has the camera 21 and monitor 22, and communicates with the control device 1, in which the control device 1 has: the lighting control section 15 which requests so as to change the lighting state of the indicator lamp L of a specific control unit D with a predetermined identification pattern; the indicator lamp recognition section 16 which recognizes the indicator lamp L in an image captured by the camera 21 of the terminal 2; the change pattern recognition section 17 which recognizes a change in the lighting state of the indicator lamp L in the image captured by the camera 21; the indicator lamp specification section 18 which specifies the indicator lamp L having a change pattern of the lighting state recognized by the change pattern recognition section matches the identification pattern as the indicator lamp L of the control unit D for which the lighting control section 15 changed the lighting state to the identification pattern; and the display control section 19 which causes information related to the control unit D having the indicator L specified by the indicator lamp specification section 18 to be displayed on the monitor 22 of the terminal overlapping image captured by the camera 21.

The control system 100 equipped with such a configuration can link the indicator lamp L in the image captured by the camera 21 of the terminal 2 and the control unit D connected to the control device 1, even if the arrangement of the indicator lamp L of the control unit D is unclear. The control system 100 can thereby easily specify the control unit D. For this reason, by using the control system 100, even in a case of the arrangement of the control unit D not being known in advance, it is possible to easily specify a control unit D for which the communication state is poor from among the several control units D, or a control unit D becoming the target of maintenance or the like. In addition, so long as using the control system 100, it is possible to easily visually confirm detailed information such as the communication state of a plurality of control units.

Figure 8:
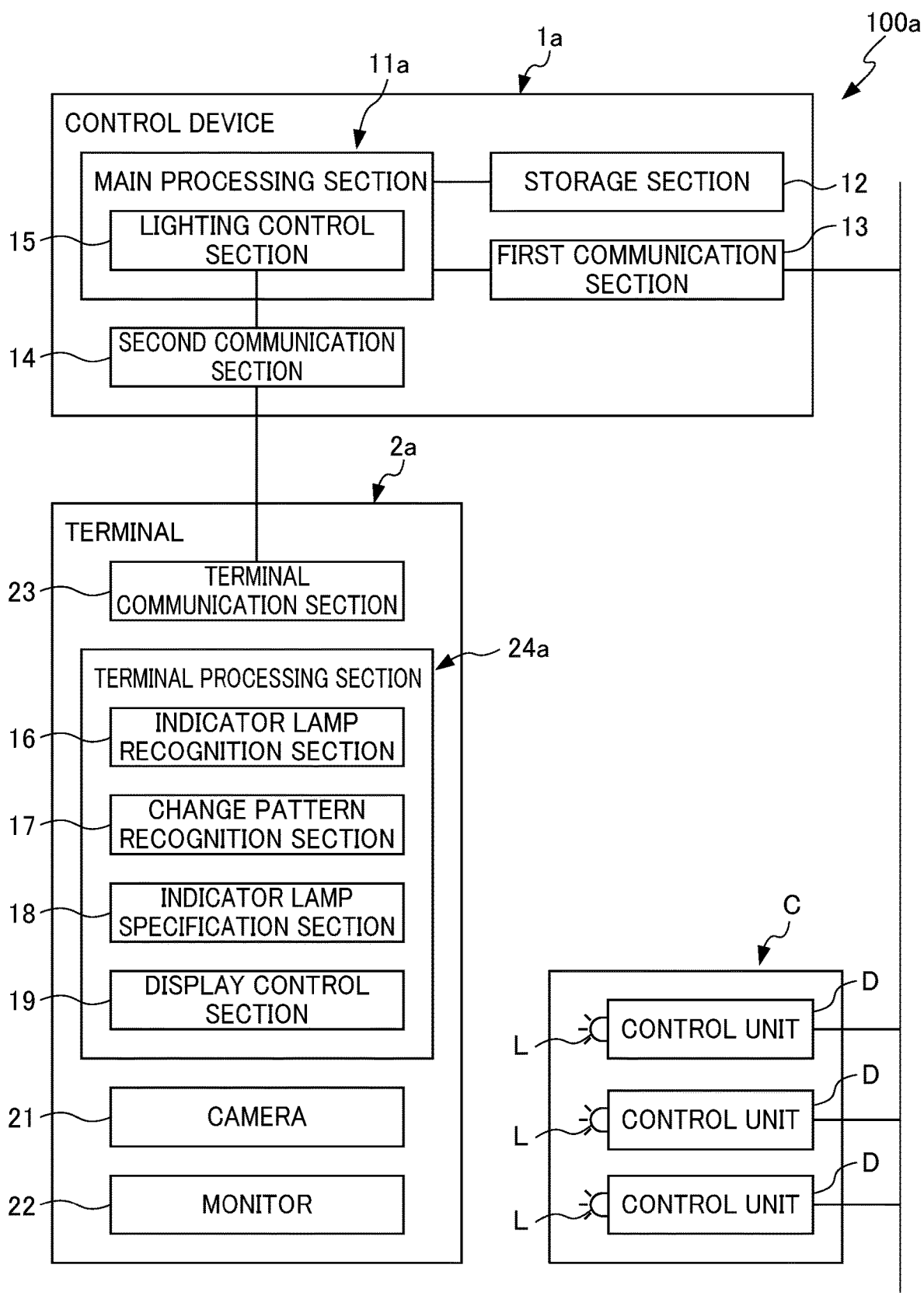
FIG. 8 is a block diagram showing the configuration of a control system according to a second embodiment of the present disclosure.

Next, a second embodiment will be explained. FIG. 8 is a block diagram showing the configuration of a control system 100a according to the second embodiment of the present disclosure. For the control system 100a in FIG. 8, the same reference symbol is attached to constituent elements which are the same as the control system 100 in FIG. 1, and redundant explanations will be omitted.

The control system 100a includes a control device 1a which communicates with the plurality of control units D, and a terminal 2a which communicates with the control device.

The control device 1a includes: a main processing section 11a which processes information; the storage section 12 which stores information; the first communication section 13 which communicates with a plurality of control units D; and the second communication section 14 which communicates with the terminal 2.

The terminal 2a includes: the camera 21; the monitor 22; the terminal communication section 23 which communicates with the second communication section 14 of the control device 1; and a terminal processing section 24a which controls these constituent elements.

The main processing section 11a of the control device 1a has the lighting control section 15 which requests so that the lighting state of the indicator lamp L of a specific control unit D changes in a predetermined identification pattern.

The terminal processing section 24a of the terminal 2a has: the indicator lamp recognition section 16 which recognizes the indicator lamp L in the image captured by the camera 21 of the terminal 2; the change pattern recognition section 17 which recognizes a change in the lighting state of the indicator lamp in the image captured by the camera 21; the indicator lamp specification section 18 which specifies an indicator lamp L having a change pattern of the lighting state recognized by the change pattern recognition section that matches the identification pattern, as the indicator lamp L of the control unit D for which the lighting control section 15 changed the lighting state in the identification pattern; and the display control section 19 which causes information related to the control unit D having the indicator lamp L specified by the indicator lamp specification section 18 specified by the indicator lamp specification section 18 to be displayed on the monitor 22 overlapping the image captured by the camera 21.

The control system 100a in FIG. 8 is the same as the control system 100 in FIG. 1, except for the point of the indicator lamp recognition section 16, change pattern recognition section 17, indicator lamp specification section 18 and display control section 19 being provided to the terminal processing section 24a.

The control system 100a in FIG. 8 can shorten the time delay between the image captured by the camera 21 and the image displayed on the monitor 22, even in a case of the communication speed being low, since the communication load between the second communication section 14 and terminal communication section 23 is small. In the control system 100a in FIG. 8, since the computation load of the terminal processing section 24a is large, the terminal processing section 24a preferably has a high computing power.

Although the respective preferred embodiments of the control system according to the present disclosure have been explained above, the control system according to the present disclosure is not limited to the aforementioned embodiments, and modifications thereto are possible where appropriate.

For example, the control systems 100 and 100a can be used in order to specify a control unit based on the change pattern of the indicator lamp by photographing a mechanical device, etc. in which the control unit is integrally formed with the main body.

EXPLANATION OF REFERENCE NUMERALS 100, 100a control system
1, 1a control device
2, 2a terminal
11, 11a main processing section
12 storage section
13 first communication section
14 second communication section
15 lighting control section
16 indicator lamp recognition section
17 change pattern recognition section
18 indicator lamp specification section
19 display control section
21 camera
22 monitor
23 terminal communication section
24, 24a terminal processing section
D control unit
L indicator lamp

What is claimed is:

1. A control system which communicates with a plurality of control units having an indicator lamp capable of changing a lighting state as needed, and controls the plurality of control units, the control system comprising:
    a control device which communicates with the plurality of control units; and
    a terminal which has a camera and a monitor, and communicates with the control device,
    wherein the control device has a lighting control section which requests so as to cause the lighting state of the indicator lamp of a specific one of the control units to change in a predetermined identification pattern, and
    wherein the control device or the terminal has:
    an indicator lamp recognition section which recognizes the indicator lamp in an image captured by the camera of the terminal;
    a change pattern recognition section which recognizes a change in the lighting state of the indicator lamp in the image captured by the camera;
    an indicator lamp specification section which specifies the indicator lamp having a change pattern in lighting state recognized by the change pattern recognition section which matches the identification pattern, as the indicator lamp of the control unit which the lighting control section caused the lighting state to change in the identification pattern; and
    a display control section which causes information related to the control unit having the indicator lamp specified by the indicator lamp specification section to be displayed on the monitor of the terminal overlapping the image captured by the camera.

2. The control system according to claim 1, wherein the display control section causes a name of the control unit having the indicator lamp specified by the indicator lamp specification section to be displayed on the monitor.

3. The control system according to claim 1, wherein the display control section causes a communication state of the control unit having the indicator lamp specified by the indicator lamp specification section to be displayed on the monitor to be associated with the indicator lamp in the image captured by the camera.

4. The control system according to claim 1, wherein the lighting control section requests so that a plurality of the indicator lamps change simultaneously in identification patterns which differ from each other.

5. The control system according to claim 1, wherein the lighting control section requests, in a case of a plurality of the indicator lamps existing which have a change pattern of the lighting state recognized by the change pattern recognition section as matching the identification pattern, so as to cause the lighting state of the indicator lamps which are the same to change by substituting the identification pattern for which a plurality of the change patterns which match are existing with a different identification pattern.

* * * * *